United States Patent Office 3,067,648
Patented Dec. 11, 1962

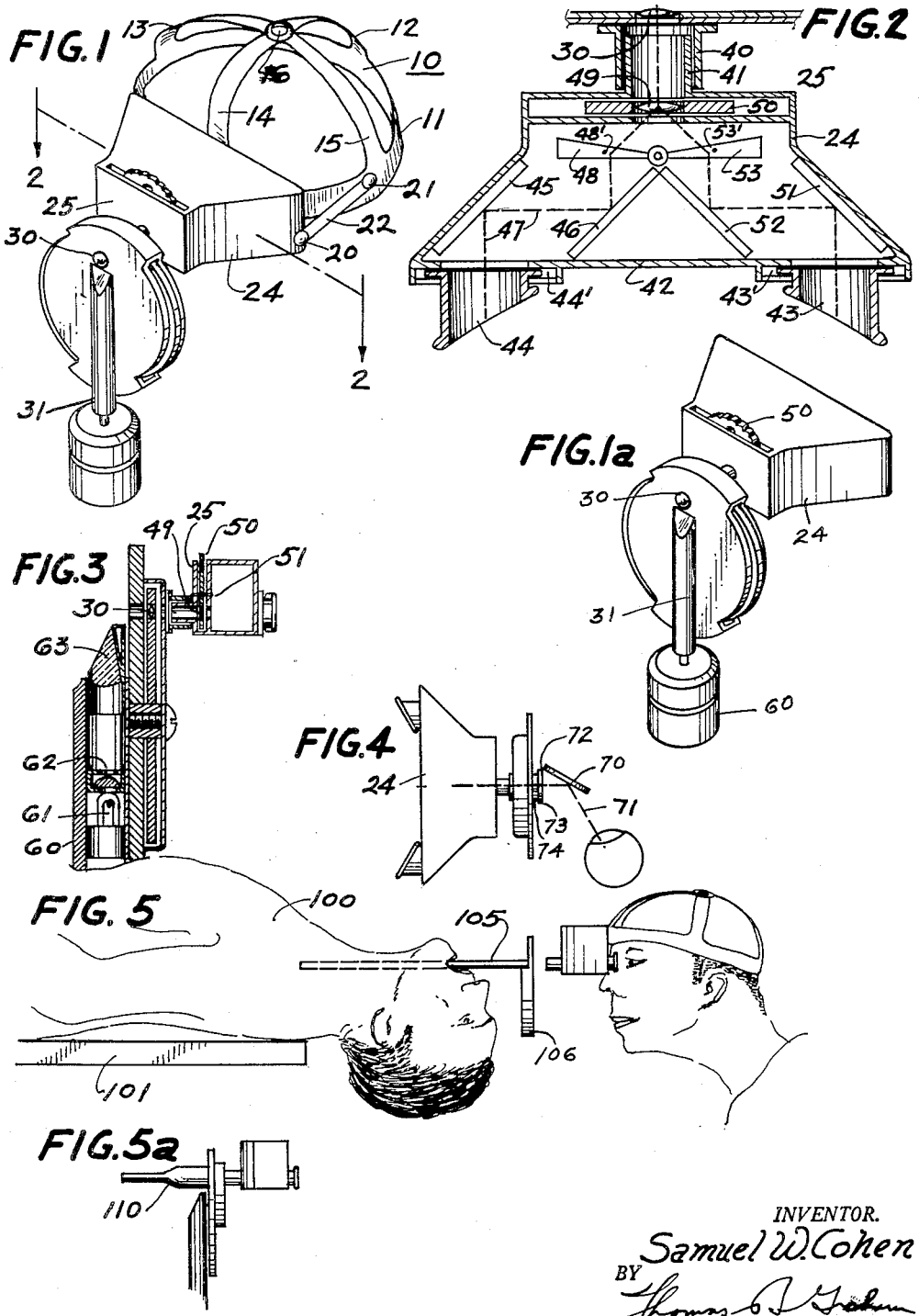

3,067,648
OPTICAL INSTRUMENT WITH BINOCULAR
VIEWING ATTACHMENT
Samuel W. Cohen, 135 Eastern Parkway, Brooklyn, N.Y.
Filed Oct. 5, 1959, Ser. No. 844,575
2 Claims. (Cl. 88—29)

This invention relates to an improvement in ophthalmoscopes such as are commonly employed by ophthalmologists in the examination of the eyes and in more general terms, to an improved optical system applicable to any instrument for close range, direct, visual examination, through small openings, into deep cavities in the body, the improvement being characterized by the fact that it relates to structure and optical system, particularly advantageous in making the instrument binocular for stereoscopic vision and depth of perception.

In general, instruments like direct, hand ophthalmoscopes consist of a unit such as described in United States Patent 1,516,133 or in United States Patent 2,027,633, wherein a rotary wheel serves to carry small diameter lenses of different power levels arranged about its axis of rotation, each individual lens being mounted so that it registers with a suitable sight opening on the main supporting frame, so that changes in lenses can be conveniently made by indexing them into the line of sight. Because the instrument is a hand instrument and is designed for close visual inspection of cavities of the body, the sight opening through which examination is to be accomplished is of quite small diameter and in the past it has been impossible to have a binocular, direct, hand ophthalmoscope for this kind of examination.

It is, accordingly, a fundamental object of this invention to provide a structure and optical system useful in developing binocular, direct vision in medical instruments employing sight or examination through extended tubes into deep cavities of the body.

It is another object of this invention to provide a direct, hand, binocular, ophthalmoscope suitable for use by a physician in his examinations using substantially conventional examining technique, wherein quite close visual inspection of parts to be examined is carried out by the physician's close approach to the surface being studied, i.e., approach to within a few centimeters.

Other objects and advantages of the invention will in part be obvious and in part appear hereinafter.

The invention, accordingly, is embodied in a binocular instrument suitable for the examination of deep cavities of the body through small narrow openings; for example, for use in such instruments as a bronchoscope, proctoscope, sigmoidoscope, otoscope, laryngoscope, esophogoscope, culdoscope, peritonoscope, gastroscope and cystoscope, the invention being characterized by the application of a binocular optical viewing system to the sight opening of the examining instrument, wherein an illuminating beam is directed from the sight opening by means of a light source provided in the instrument, and binocular visual examination is made possible by means of a selection of lenses, prisms and mirrors providing a high level of correction, so that binocular vision at close range through the single examination or viewing opening of only a few millimeters' diameter is attainable and, furthermore, is attainable with magnification, or reduction, and with three dimensional effect. In general, instruments of the types mentioned have in common the feature that they employ sighting through a long tube and in the past have been treated as inherently susceptible only to monocular construction. The mechanics of binocular vision indicate internal construction for the culdoscope, peritonoscope, gastroscope, and cystoscope.

The invention will be better understood by reference to the following drawings, wherein the general construction of the instrument, together with certain structural details have been shown.

Referring now more particularly to the drawings,

FIGURE 1 is a general view, in perspective, showing how the instrument may be optionally provided with a head frame so that it can be carried on the head of the examining physician, leaving his hands free; it, of course, is understood that the headgear can be omitted; FIGURE 1a is a general view of the hand instrument.

FIGURE 2 is a sectional view taken along a plane corresponding to the binocular line of sight;

FIGURE 3 is a section through the hand portion of the instrument, showing some of the mechanism for providing the illumination beam at the inspection opening. Essentially, the structural portion below the examination opening shown in FIGURE 3 may be considered conventional;

FIGURE 4 is an illustration of the improvement geometrically attainable by means of the external viewing mirror in combination with the light and viewing opening of the instrument;

FIGURE 5 is a diagrammatic illustration of the application of the invention to a bronchoscope; in FIGURE 5a its use with the otoscope is also shown.

Referring now to FIGURE 1, there is shown a head frame 10 consisting of a head band 11 which, of course, is made adjustable to suit the head size of the user and is further equipped with top straps 12, 13, 14 and 15, which may be connected together by means of a ring 16 merely to provide a reasonably firm headrest and support for the instrument.

Connected to the head support by means of side clips such as 20 and 21, supports like 22 are attached to and support the binocular housing 24 for the optical system of the instrument itself. Within the housing 24 there is mounted the optical system by means of which binocular vision is provided through front face 25 via sight opening 30, which is illuminated from below so that the external structure embodied in the handle and housing 31 includes the parts normally associated with a hand monocular ophthalmoscope.

For further detail with respect to the optical system, reference may be had to FIGURE 2 which is a section taken on the line 2—2 in FIGURE 1 corresponding to the horizontal plane of vision of the user of the instrument. In FIGURE 2, the housing is shown as having a main section 24 and a forwardly directed narrow section 40 telescoping with a section 41 so that the line of vision can be lengthened or shortened in accordance with the magnifying power of the particular lens being used for examination purposes.

A back face 42 may be curved to fit the contours of the user's forehead and is equipped with sight openings 43 and 44. Generally, it is advisable to provide for minor small adjustment of the distance between openings 43 and 44, as indicated by adjustable slides 43' and 44', to accommodate the minor variations there might be in the interpupillary distance among users.

The optical system within the housing, which makes possible the binocular viewing, is shown diagrammatically with reference to the line of sight as consisting of mirror 45, arranged at 45° angle to the forward line of sight, mirror 46 also at 45° to the reflected line of sight, which is indicated by dotted line 47. The observer looks at mirrors 45 to 46 and, thereafter, the line of sight is directed through prism 48 and thence through a lens 49. Generally, the lens 49 will have a value of moderately high minus (i.e., −10 to −30) for magnification, or combined with a + lens in front to make a Galilean type telescope arrangement for higher magnification. Following this the line of sight is then through the lens and examining or sight opening 30 corresponding to the usual examining opening of the monocular instrument in use. Lens 49 is preferably mounted on a wheel or disk of lenses suitable for being aligned in the line of sight and registration with the opening 30.

The corresponding line of sight for the second eye is through the opening 43 to the mirror 51, to the mirror 52, through the prism 53 and thence to the lens 49, whereby the binocular effect is made possible.

The structure holding the lens and lens wheel at the opening 30 is made to conform substantially to a conventional type of ophthalmoscope which is shown diagramatically in FIGURE 3. There, inasmuch as the internal details can be made in conventional form, the elements of the structure are shown only diagrammatically. Thus, 60 represents a handle for the binocular instrument which commonly will contain a battery arranged with a switch, so that light 61 may be lighted and the light beam directed through condenser lens 62 to prism 63 and therefrom into or on the subject being examined. Aligned immediately above and behind the prism is the opening 30 constituting the peephole through which binocular inspection is obtained.

For refinements of the structure to obtain the degree of usefulness desired, it is evident that virtually any combination of lenses which may be useful for purposes of the examination may be used. For example, the lens 49 is carried by a wheel which may contain a number of lenses suitable for magnification, the lenses having values from 0 to −30, for example. In FIGURE 3 the relationship of lens 49 to its wheel 50, wheel axis 51 and the line of sight is shown. The plurality of lenses like 49 is spaced around the wheel and suitable structure for indexing the lenses into the line of sight is provided.

Within the binocular viewing section, prisms 53 and 48 are preferably of moderate value and I have found that a prism, having a value of only about 7–10 prism diopters is suitable for giving an angle to the rays of light sufficient to make the binocular inspection possible. The prisms can be arranged to be rotated singly or together about their axes 48' and 53', respectively either towards or away from mirrors 46 and 52 for stereoscopic focusing.

In external appearance, therefore, as shown in FIGURES 1 and 1a, the binocular housing portion of the instrument is about as bulky as a compact pair of opera glasses in that the total length need be no more than 5–6 centimeters. As a further convenience to the physician, the hand portion 31 may be made rotatable around the axis of the sleeve 40–41 so that for close inspection purposes, it can be indexed to a horizontal or oppositely oriented vertical position to put it out of the physician's way.

As an additional feature in the design of the instrument, as shown in FIGURE 4, mirror 70 may be hinged to the external face of the device at an angle of 45°–90° (variable). When the line of sight is along 71, through opening 30, to mirror 70, it becomes possible to see areas around the periphery of the retina where it is quite clear that normally, with a single, straight line, monocular ophthalmoscope, visual examination cannot be made. In fact, normally direct monocular examination of the eye with a conventional ophthalmoscope permits inspection of only about half of the retina—that is, the part intercepted by a cone having its apex in front of the cornea. By making the mirror adjustable in its angle, i.e., hinging it at 72, through having it carried by a rotating ring 73, carried in collar 74 (by threading) it becomes possible to extend the inspection of the retina far out over any meridian of the periphery of the eye being examined.

To develop substantial magnifications, the housing is made with collapsing sleeves so that the external portion of the viewing mechanism may be moved forward or backward for purposes of obtaining the right degree of magnification, a plus lens on the front wheel and a minus lens on the rear wheel being used.

As materials of construction, essentially the conventional type plastic case, brass parts, high refractive glass, high quality lenses, all consistent with a precision instrument formed for precision and careful work are indicated.

The application of the principle of the invention to several other forms of instrument used for examining deep cavities of the body is illustrated in FIGURES 5 and 5a. Thus, in FIGURE 5, 100 represents a patient as he would be positioned on table 101 for bronchial examination. The bronchoscope which consists essentially of a long narrow tube 105 equipped with a handle 106, is inserted through the patient's mouth and the binocular viewing system of this invention is directly applicable as shown.

Thus the surgeon can first insert the bronchoscope to desired depth with the binocular instrument resting on his forehead. Then when he wants to visualize the desired area he merely flips the binocular scope down in front of his eyes.

In FIGURE 5a, the otoscope 110, which is merely a short subular speculum, is attached to the front face to permit insertion of the speculum into a patient's ear and thereby obtain binocular inspection of internal portions. If desired, the speculum can be inserted, unattached to the scope, and with one hand holding the speculum and the scope attached to his head, the second hand of the surgeon is free to operate with other instruments under binocular control.

With this invention stereopsis and depth perception and visual detail are not lost when changing lenses through a large dioptric range. Whereas in the monocular type of ophthalmoscope, where stereopsis and depth perception are absent, visual detail is almost immediately impaired when varying the lenses from the improper to the proper dioptric power and vice versa.

What is claimed is:

1. A hand optical instrument for providing close highly magnified binocular direct vision through a narrow opening of an order of magnitude of the diameter of the pupil of the eye, said instrument comprising a frame having an opening therein; a rotary carrier mounted on said frame and having a series of different lenses thereon registrable with said opening; and viewing means on the rear face of said instrument providing for binocular vision through said opening, comprising a housing having in one face thereof a pair of sight openings spaced to approximate the interpupillary distance of the user and in an opposed face thereof a single central opening, telescoping sleeves between said opening in said frame and said central opening, one sleeve being attached to the face of said housing and the other sleeve abutting the said instrument frame for varying the spacing of said frame and said housing, a second rotary carrier in said housing having a series of different magnifying lenses for selective alignment with said opening in said frame and said central opening, an outer pair of mirrors mounted in said housing in alignment with said sight openings, an inner pair of mirrors abutting along a vertical line intersecting the axis of said central opening and a pair of wedge prisms positioned forwardly of said inner pair of mirrors and having their apex edges abutting each other along a vertical line intersecting the axis of said central opening and parallel to the intersecting line of said inner pair of mirrors.

2. The optical instrument of claim 1 in which said prisms are vertically, pivotally mounted for adjustment toward and away from said inner mirrors.

References Cited in the file of this patent

UNITED STATES PATENTS

| | | |
|---|---|---|
| 1,240,905 | Troppman | Sept. 25, 1917 |
| 2,444,172 | Silverstein | June 29, 1948 |
| 2,559,698 | Bahre | July 10, 1951 |
| 2,639,653 | Fischer | May 26, 1953 |
| 2,655,076 | Armstrong | Oct. 13, 1953 |
| 2,757,574 | Thorburn | Aug. 7, 1956 |

FOREIGN PATENTS

| | | |
|---|---|---|
| 273,563 | Germany | May 2, 1914 |
| 323,162 | Germany | July 16, 1920 |